US005527147A

United States Patent [19]

Hulls

[11] Patent Number: 5,527,147
[45] Date of Patent: Jun. 18, 1996

[54] WASTE HANDLING METHOD AND APPARATUS FOR TRANSFERRING WASTE FROM COLLECTION VEHICLES TO TRANSFER TRAILERS

[75] Inventor: John R. Hulls, Point Reyes, Calif.

[73] Assignee: Altamont, Inc., Key Biscayne, Fla.

[21] Appl. No.: 332,249

[22] Filed: Oct. 31, 1994

[51] Int. Cl.$^6$ .......... B65G 7/20

[52] U.S. Cl. .......... 414/786; 414/400; 100/229 A

[58] Field of Search .......... 414/303, 373, 414/398, 400, 585, 786; 100/229 A; 198/483.1

[56] References Cited

U.S. PATENT DOCUMENTS 3,040,914 6/1962 Johnson et al. .
3,059,789 10/1962 Bowles .......... 414/400 X
3,186,566 6/1965 Spinanger et al. .
3,231,107 1/1966 Clar .......... 414/400 X
3,557,685 1/1971 Schroering .
3,561,624 2/1971 Thurmond et al. .......... 100/229 A X
3,625,374 12/1971 Hemphill .
3,640,410 2/1972 Pioch .......... 100/229 A X
3,640,411 2/1972 Anderson .......... 100/229 A X
3,647,095 3/1972 Smith .......... 414/400 X
3,753,506 8/1973 Palmer et al. .......... 100/229 A X
3,888,351 6/1975 Wilson .
3,962,965 6/1976 Corompt .
4,044,905 8/1977 Liberman et al. .
4,123,970 11/1978 Quante .
4,256,434 3/1981 Stodt et al. .
4,279,557 7/1981 Stodt et al. .
4,487,120 12/1984 Barstow .
4,677,909 7/1987 Beesley et al. .......... 414/400 X
4,877,366 10/1989 DeFilippi .
4,923,356 5/1990 Foster .
4,990,048 2/1991 Foster .
4,995,780 2/1991 Dietzler .
5,044,870 9/1991 Foster .
5,148,739 9/1992 Fox .

FOREIGN PATENT DOCUMENTS 2820276 11/1979 Germany .......... 414/400
624361 7/1981 Germany .

*Primary Examiner*—James W. Keenan
*Attorney, Agent, or Firm*—Majestic, Parsons, Siebert & Hsue

[57] ABSTRACT

A compactor places baled waste into a shuttle container that is moved along a conveyor system. This shuttle container is then moved to an unloading device, where the compacted trash can be placed into a transfer trailer. The use of the shuttle containers on the conveyor system allows for the compacting and the unloading functions to occur independently. The system is a modular one that can be expanded as required. Shuttle containers on the conveyor system can be stored until a transfer trailer is available.

15 Claims, 2 Drawing Sheets

WASTE HANDLING METHOD AND APPARATUS FOR TRANSFERRING WASTE FROM COLLECTION VEHICLES TO TRANSFER TRAILERS

BACKGROUND OF THE INVENTION

This invention relates to a process and apparatus for the disposal and handling of waste. More particularly, this invention relates to waste disposal systems that use a transfer station.

Municipal waste handling is a costly problem facing cities and counties. Waste handling technology has become a conglomeration of processes with significant difficulties and serious inefficiencies. In an attempt to realize economies of scale, current facilities are built as large as possible, resulting in huge amounts of traffic, noise and odors. While this may be marginally acceptable in a remote landfill site, this is clearly not the case for transfer stations in an urban area. The traffic, noise and odors dramatically reduce the potential waste handling sites in a community. The need to build to suit maximum projected waste loads far into the future further increases costs and limits available sites. The history of waste handling shows that building facilities based on future projected demand is both expensive and risky.

The handling of municipal waste has changed dramatically as a result of environmental factors, demographic shifts, geographical considerations, and social and regulatory changes. As recently as twenty years ago, the majority of waste was delivered to small landfills adjacent to population concentrations in the same vehicles that collected the garbage from individual homes and businesses. As these landfills reached their capacity, and as environmental difficulties from ground water contamination and the like caused additional closures, a trend towards large landfills distant from population centers emerged. This trend gave rise to the development of transfer trailers, large semi-trailers that were used to carry the waste the often hundreds of miles distant from the population centers to the safe modern landfills. To service these trailers, transfer stations were developed. Transfer stations typically comprised large buildings with unloading areas for collection vehicles, tipping floors to allow the accumulation of trash, and pits into which the transfer trailers would drive to be loaded. The trash is loaded by pushing the waste with large bulldozers from the tipping floor through slots located above the transfer trailers into these transfer trailers.

Each of the areas in this type of transfer station must be sized to accommodate large fleets of collection vehicles and transfer trailers, as well as large amounts of accumulated uncompacted trash. Without excess capacity in each operation of the system, it is impossible to accommodate fluctuations in either the rate at which trash is accumulated, or the rate at which the trailers can ship it out. In addition, large numbers of equipment operators are required to ensure that peak capacity is available, even though these operators are not required the majority of time.

The large required land areas, noise, dust, exposed trash, vermin and traffic of typical transfer stations makes them poor neighbors. This, in turn, makes the siting of transfer stations a difficult community problem. The long-term projections of waste flow and large capital cost which must be paid by the community being served make the risk to existing ratepayers a frequent complaint.

More recently, two other trends have influenced the requirements for transfer station design. They are the modern, highly productive collection vehicles and the requirements for recycling. While seemingly different, these trends have the same effect on planning of transfer stations locations. Given the cost of the modern collection vehicle, the time spent travelling to and from the collection area is unproductive, both for equipment and crew. Thus, for efficient operation, it is desirable to locate the transfer station as close to the service station as possible. Likewise, the curbside recycling programs require additional vehicle operations, and thus suffer even more when the transfer station is located at some distance from the collection area. The conventional transfer stations large sites and problems with neighbors dictate against the location of such facilities close to the population centers that they serve.

There have been several attempts to address the failings of the current transfer facilities, and to improve their efficiency. Some facilities are using large compactors that form bales that are placed on the transfer trailers. These units, while allowing formation of accurately weighed loads, do not solve the problem of the mismatch in the process rates. If there is no trash present, the system cannot operate, and if a transfer trailer is not available for immediate removal of the formed bale, the process also stops. Since the same piston that compacts the waste at high pressure is also used to unload the compacted trash onto the trailer, the compactor requires a large high-pressure cylinder with a very long stroke, which is both slow and expensive. In a similar approach, Foster U.S. Pat. No. 5,044,870 describes a system where bulk material is compacted and moved onto a trailer by means of a walking floor. This system suffers from the same delay problems as the compacted bale system described above.

Quante U.S. Pat. No. 4,123,970 describes a system where trash is dumped into a number of hoppers, the weight of the contents of each hopper being determined by weighing the collection vehicle prior to dumping. A control system then selects from the appropriate hoppers by dumping them onto a conveyer to feed a compactor to produce bales of trash. The unit comprising the compactor with rotating pressing boxes and unloading plunger does not address the issues of holding large volumes of uncompacted waste from the delivering collection vehicles. Nor does this system provide the means necessary to separate the compacting and loading operations so as to accommodate wide variations in waste feed rate and shipping rate. Indeed, Quante is silent on the trailer loading and shipping aspects of transfer station design.

A further inefficiency of compactor transfer stations is that they are not integrated with the landfill operations. Even though the compactors have the ability to produce large stable briquettes (industry term for a bale of material compressed beyond its elastic limit so as to not require banding or strapping) that are of greater density than the landfills, the briquettes are broken apart at the landfill. This requires expensive compaction equipment, and the crews involved to make sure that the trash is contained within the landfill site and does not become litter on adjacent properties. These requirements are a substantial expense, which ultimately must be paid for by the individuals being served in each community that ships waste to the landfill.

It is an object of the present invention to provide a process that reduces the exposure of trash to the environment, thus controlling odors, blown trash, vermin, and other environmental problems. Another object of the invention is to provide a process where the compactor stage of the process can operate continuously as waste is received at the transfer station, unloading the baled waste into shuttle containers without the requiring transfer trailers to be available. Yet another object of this invention is to provide a process where transfer trailers can be loaded from the shuttle containers independently of the operation of the rest of the process, so that the transfer trailers do not have to wait for loads to be formed before transporting the waste to the landfill. In this manner, the efficiency of the transfer trailer fleet operation can be increased.

SUMMARY OF THE INVENTION

The invention differs from previous practice in that the waste is rapidly formed into bales of sufficient compaction that they may be maintained intact throughout the process of disposal, including placement in the landfill, without being wire bound or otherwise restrained.

This process also differs from the previous systems in that the bales formed from the waste are stored in shuttle containers that hold the formed bales, and can store them until a transfer trailer is available to transport the bales to the landfill. With the present system, waste need not be stored in pits and tipping areas when a transfer trailer is not available. This means that the compactor can be utilized independently of the transfer fleet, thus operating continuously and providing far greater efficiency in the use of the compactor.

Another benefit of an embodiment of the present invention is the use of an unloading device separate from the compactor. This unloading device can be a separate loading ram. This separate loading ram can be used for loading the transfer trailer, rather than using the ram in the compactor to load the trailers. The use of a separate unloading device allows the trailer to be loaded independently of the compactor. This avoids the necessity of the transfer trailer having to wait until the load is formed, thus making the utilization of the trailer more efficient than the conventional transfer operation.

The invention further comprises a process whereby waste received at a transfer station is fed into a compactor which forms bale segments. These bale segments will preferably be formed with a density such that they will remain stable without being bound or wrapped (i.e., greater than eight hundred pounds per cubic yard for some waste). The bale segments are loaded onto a shuttle container. The bale segments can be placed upon this shuttle container until the weight of the bale segments is equal to the maximum payload of the transfer trailers used to transport the waste from the transfer station to the landfill or other disposal site. Shuttle containers are loaded as the waste is received by the transfer station.

After loading, the shuttle containers are moved along a conveyor system. When a transfer trailer comes to the transfer station for loading, the loaded shuttle container is moved in front of the ram device capable of pushing the formed bale from the shuttle container into the transfer trailer. The shuttle container is then ready to be removed and reloaded at the compactor.

Optionally, the shuttle containers can be open on both ends and can slidably contact bulkheads. The bulkheads could have openings at the unloading device and the compactor.

The present invention could also optionally be used for recycling systems where different types of waste can be baled by the compactor and placed into a designated shuttle container for that material type. In this way, the bales can be formed until a trailer load of the discrete type of waste is available, and then unloaded into the transfer trailers.

The waste bales can be transported to the landfill with the transfer trailer. By means of an unloading device in the trailer, the bale is ejected down a portable ramp so that the bale is placed intact in its final resting place in the landfill.

The present invention has a number of advantages. The present system has low operating costs. The number of operating personnel can be reduced, since use of sufficiently compressed bales prevents the need for people to search after blown trash, and can reduce the number of personnel required to dispose of the trash at the landfill site. The compacted trash can be directly placed into the landfill. No additional handling equipment is required at the transfer or landfill site. Handling equipment, such as bulldozers, have a low operating lifespan at these sites. The system also employs commercially-available components.

The present invention minimizes the environmental impact at the transfer station and the landfill. The stored waste is fully enclosed at all the stages of the operation. This system does not require a trash dumping pit at the transfer station. Additionally, the use of the baled waste, which is not broken back up at the landfill site, prevents blown waste. Since the stored waste is fully enclosed at all stages of the operation, the trash odors can be easily contained with an airflow system. The transfer equipment can also be placed into a smaller site. No special pits or facilities are required. This means that the buildings can be easily converted to other purposes if the contract or route structure of the operation changes, simply by removing the equipment. This also means that the building costs are reduced.

The fully modular nature of the system allows for operational and design flexibility. The systems can be readily expanded or moved to suit changing needs. No engineering is required for the transfer system except for the building and minor foundational details. System redundancy and spares can be easily managed. Additional compactors and unloading rams can be added as needed.

The above advantages produce significant business benefits. The improved environmental impact of the system should give bid advantages to contractors. The standardized design reduces the cost and response time. The system can be removable in case of a change in the contract. Systems can also be built for the present capacity and additional modules added or subtracted to suit local needs. Additionally, the materials used in the present invention could be built by local metal fabricators, giving a wide range of vendors. Further, due to the modular nature, the design costs for the transfer station are reduced.

BRIEF DESCRIPTION OF THE DRAWINGS

The above and other features and aspects of the present invention will become more apparent upon the reading of the following detailed description in conjunction with the accompanying drawings, in which:

In FIGS. 1 through 3, the structures that remain unchanged are labeled with the same number between the three figures.

DETAILED DESCRIPTION OF THE PREFERRED EMBODIMENT

Figure 1:
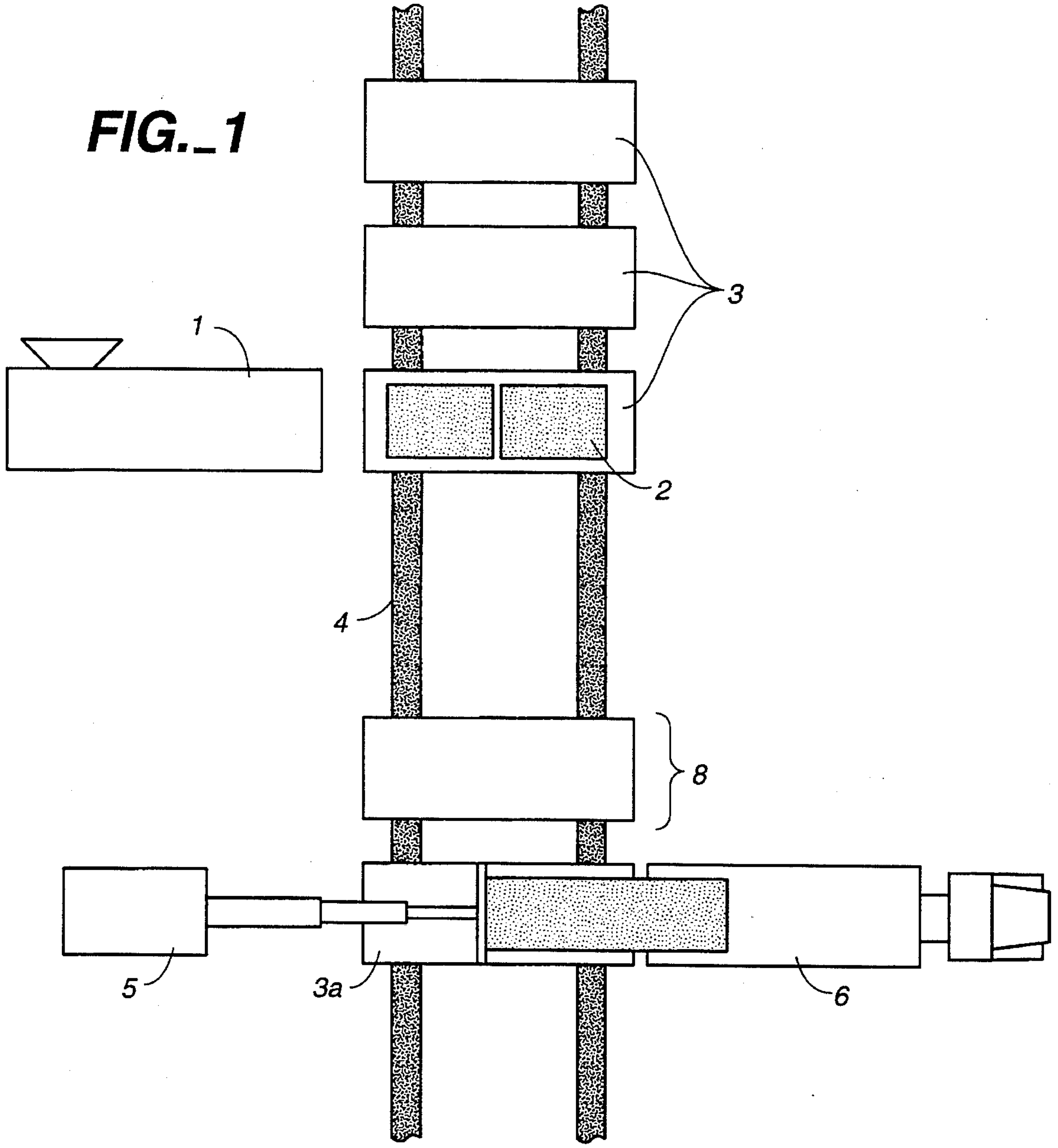
FIG. 1 is a diagrammatic view of the structures of the present invention showing the compactors, shuttle containers, unloading device and transfer trailer.

FIG. 1 is a diagrammatic view of the structures of the present invention showing the compactor 1, shuttle containers 3, unloading device 5, and transfer trailer 6. In a preferred embodiment of the system, waste is fed into the compactor 1 by means of a conveyor or other system. The compactor is similar to those of commercially-available devices, such as those made by SSI Inc. of Wilsonville, Oreg., which produce a bale of known weight. However, it is not required to form an entire baled trailer load in one unit, so the compactor units can be simplified to produce smaller bale segments 2, thus allowing a shorter stroke and higher pressure. These higher pressures can help maintain the trash in the compacted state as it is moved through the system.

The bale segments 2 are loaded into one of a number of shuttle containers 3 by ejecting them from the compactor 1 into the shuttle container 3 until they form a bale equal in weight to the maximum payload of the transfer trailers 6 which are employed. The shuttle container 3 can be simple boxes of steel or other material of sufficient size and strength to support the weight of the bale when moved on the conveyor system 4. These shuttle containers are cheaper than the transfer trailers, and so this system has the advantage that it does not require a number of the more expensive transfer trailers to remain at the transfer site waiting for trash, but can store the bales in shuttle containers. The shuttle container 3 has doors at both ends that open to allow the bales to be pushed in by the compactor 1 and then later pushed into the transfer trailer 6.

The shuttle containers are mounted on a conveyor system 4 that moves the containers from the compactors 1 to the unloading ram 5, and can be of sufficient length to provide storage for the required number of shuttle containers 3. The conveyor system is similar to the shotgun systems used in logging operations. The conveyors could use a "walking floor" type of conveyor such as that available from Moving Floors, Inc. of Tillamook, Oreg. The advantage of using a walking floor system is it does not require the building of a pit and thus saves costs. The number of the shuttle containers 3 is dependent upon the size of the transfer station. In a very large transfer station, the conveyor system can be arranged so that the conveyor system can return unloaded shuttle containers in a separate return conveyor to be reloaded with bale segments. In a small transfer station, the conveyor system can be made long enough to hold sufficient containers 3.

After a shuttle container is loaded, it is moved by the conveyor system 4 so that the next shuttle container can be loaded. A number of shuttle containers can be stored at locations such as storage location 8 along the conveyor system 4 until a transfer trailer 6 is ready for loading. When a transfer trailer 6 is ready for loading, the conveyor system 4 moves the appropriate shuttle container 3 to the unloading device, such as the unloading ram 5, which is a hydraulic or other device capable of pushing the bale from the shuttle container 3*a* into the transfer trailer 6. This system could also use an automatic door opening system to open the doors of the shuttle containers 3.

Pre-sorted waste could also be used in this system. Different shuttle containers could hold different types of materials. Recyclable materials could be held in bins until a full compactor load is available. Waste of the same type of material is placed into the compactor and then stored into a shuttle container designated for that type of material. When a trailer load is available, the shuttle container is moved into the loading position, and the bales are placed onto the transfer trailer 6 by the unloading device 5.

Figure 2:
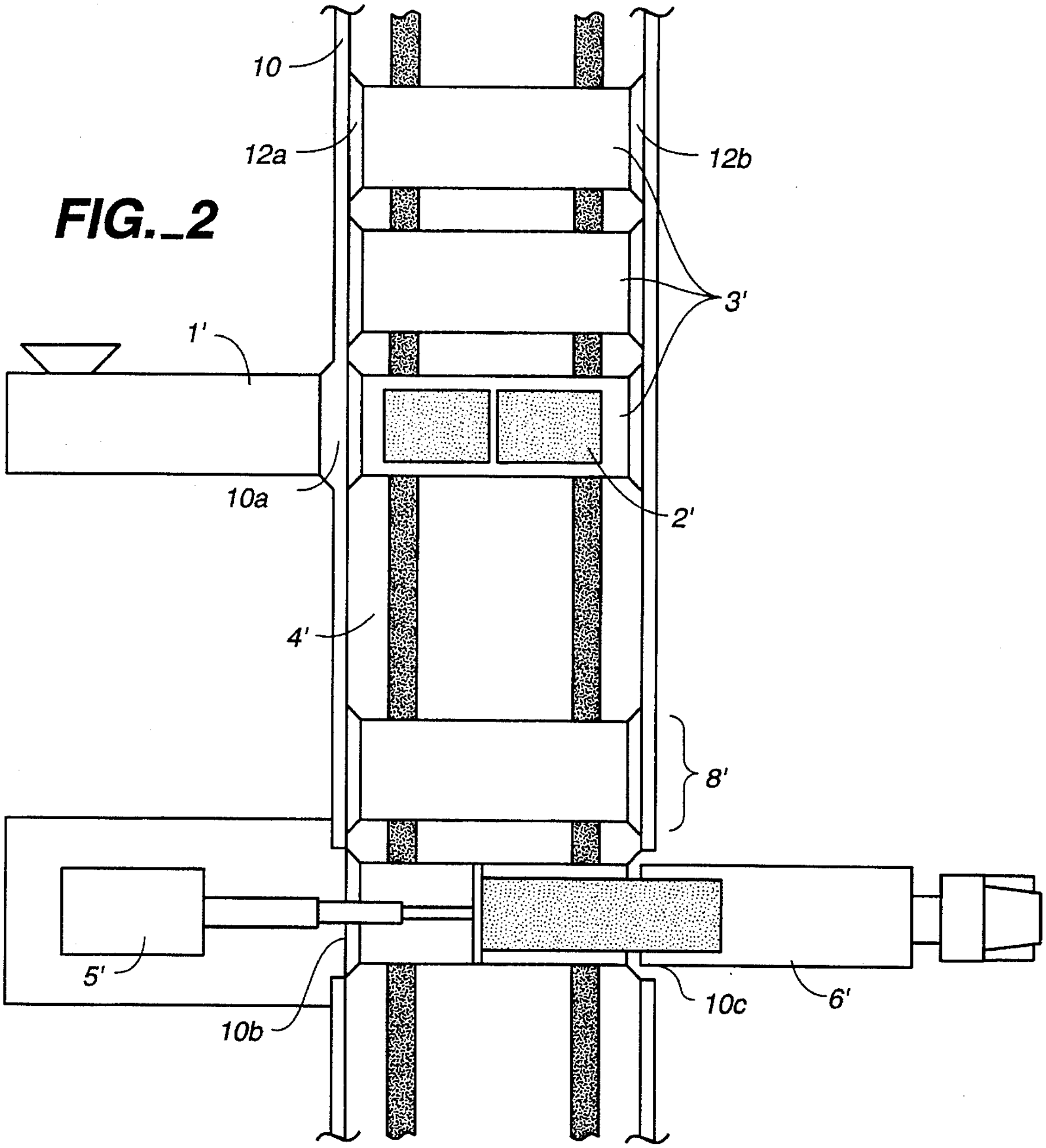
FIG. 2 is an alternate embodiment of the present invention showing the use of bulkheads to contain the bales in the shuttle containers.

FIG. 2 shows an alternate embodiment of the present invention showing the use of bulkheads 10. These bulkheads may comprise flat pieces of steel with openings 10*a* for the compactor and 10*b* and 10*c* for the unloading section. The shuttle container 3' can then be constructed of a rectangular tube of steel with openings at both ends. The shuttle container 3' has sections 12*a* and 12*d* constructed of UHMW polyethylene. This material has good wear properties in contact with steel and allows the shuttle containers to slide against the bulkheads easily. Air flow systems at the holes 10A, 10B, and 10C can be constructed of a large volume low-flow fan to produce negative pressure to prevent the odors from escaping at the compactor and the unloading ram.

Figure 3:
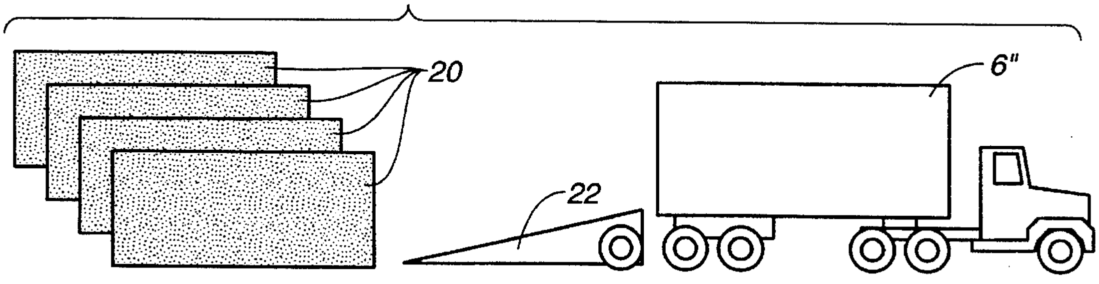
FIG. 3 is a diagrammatic view showing the transfer trailer unloading the bales at a landfill.

FIG. 3 is a diagram showing the unloading of the transfer trailer 6" at the landfill site. The compacted bales 20 can be transported to the landfill, where the bales will be ultimately disposed of. At the landfill site, the trailers 6", which are equipped with a "walking floor" device such as that manufactured by Moving Floors, Inc. of Tillamook, Oreg., are capable of unloading the intact bale onto an unloading ramp 22 which is equipped so it moves forward as the trailer unloads, thus placing the bale 20 intact in the landfill in its ultimate resting place. The ramp 22 may be equipped with a "walking floor" device or other equipment to enable the bales to be moved in place intact. The bales 20 may be pushed even tighter together against each other by means of a bulldozer before covering with the top layer of earth, as required daily in most landfills.

Various details of the implementation and method are merely illustrative of the invention. It will be understood that various changes in the details may be within the scope of the invention, which is to be limited only by the appended claims.

What is claimed is:

1. A waste handling method comprising the steps of:

(a) compacting waste into at least one bale segment;

(b) loading the waste in the form of said at least one bale segment into a shuttle container;

(c) moving the shuttle container to a storage location;

(d) moving the shuttle container containing said at least one bale segment so that one end of the shuttle container is operatively positioned with respect to an unloading device; and (e) unloading said at least one bale segment contained in said shuttle container by means of the unloading device out of the other end of the shuttle container into a transfer trailer operatively positioned with respect to said other end of the shuttle container for subsequent transfer to a landfill site for disposal.

2. The method of claim 1 wherein the number of bale segments is at least two so as to form a bale.

3. The method of claim 2 further including the steps of transporting the transfer trailer to a disposal site and unloading the transfer trailer at the disposal site with said bale being maintained in its compacted form.

4. The method of claim 3 further including the step of moving a plurality of the bales so that they are in contacting relation with each other with a minimum of space therebetween.

5. The method of claim 4 further including the step of covering the bales with a layer of earth so as to promote sanitation.

6. The method of claim 3 wherein the step of unloading at the disposal site includes moving the bale out of the trailer onto a ramp and thence down the ramp onto the landfill site.

7. The method of claim 2 wherein more than one shuttle container is sequentially positioned so that the transfer trailer is loaded with compacted bale segments until a predetermined weight is reached to form the bale.

8. The method of claim 7 further including the step of moving the loaded transfer trailer out of operative position with the unloading device.

9. The method of claim 7 further including the step of moving another transfer trailer into operative position with respect to the unloading device.

10. The method of claim 2 including applying sufficient force to compact the bale segments such that the resultant bales maintain their form without the necessity of any binding means.

11. The method of claim 1 wherein the shuttle containers are moved to a storage location on a conveyor, and wherein the step of moving the shuttle containers is done by means of the conveyor.

12. The method of claim 1 including the preliminary step of sorting waste into discrete types prior to compacting so that the resultant bale segments are made up of a single discrete type of waste.

13. The method of claim 12 including the step of selecting the same type of waste prior to loading each container so that each container holds a single type of waste.

14. The method of claim 13 including the step of selecting a shuttle container having a desired type of waste therein prior to moving it to the operative position with respect to the unloading device so that the transfer trailer contains a desired type of waste.

15. The method of claim 1 further including repeating steps 1(a) through 1(c), so as to create a plurality of filled containers in said storage location.

* * * * *